United States Patent [19]
Wilger

[11] Patent Number: 5,326,036
[45] Date of Patent: Jul. 5, 1994

[54] RADIALLY LOCKING SPRAY NOZZLE CAP

[76] Inventor: Wilfred H. Wilger, 219 Ball Crescent, Saskatoon, Sask., Canada, S7K 6E1

[21] Appl. No.: 19,174

[22] Filed: Feb. 16, 1993

Related U.S. Application Data

[63] Continuation of Ser. No. 828,298, Jan. 30, 1992, abandoned.

[51] Int. Cl.$^5$ .................................................. B05B 1/00
[52] U.S. Cl. ....................................................... 239/600
[58] Field of Search ............... 285/360, 378, 396, 81, 285/401, 402; 239/600, 557, 568, 597, 591

[56] References Cited

U.S. PATENT DOCUMENTS

| | | | |
|---|---|---|---|
| 796,220 | 8/1905 | Jones | 285/376 |
| 1,164,197 | 12/1915 | Kildear | 285/402 X |
| 1,195,433 | 8/1916 | Bailey | 285/360 X |
| 1,259,684 | 3/1918 | Vinten | 285/360 |
| 2,806,717 | 9/1957 | Hempel | 285/376 X |
| 4,334,637 | 6/1982 | Baker et al. | 239/600 |
| 4,527,745 | 7/1985 | Butterfield et al. | 239/600 |
| 4,738,401 | 4/1988 | Filicicchia | 239/600 X |

*Primary Examiner*—Andres Kashinikow
*Assistant Examiner*—Kevin P. Weldon

[57] ABSTRACT

A radially locking spray nozzle cap, particularly adapted for quick change of spray tips on agricultural sprayer nozzles, optionally having a spray tip pressed or molded permanently in the bottom thereof. The cap has slightly resilient side walls with inwardly projecting lock lugs at the top, adapted to engage above a retainer flange on a nozzle body. Rotating the cap on the nozzle body engages the lock lugs above the retainer flange and raises the cap sealingly against the nozzle body as radial lock tabs radially distort side walls of the cap until the lock lugs pass over the lock tabs to engage adjacent recesses where the lock tabs hold the cap against counter rotation.

11 Claims, 2 Drawing Sheets

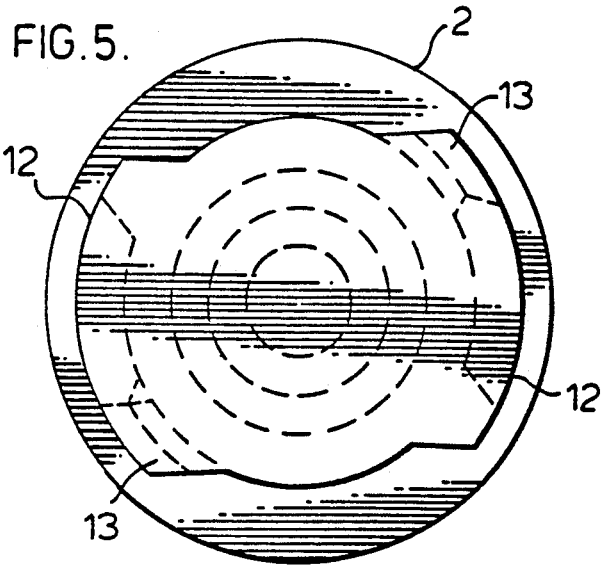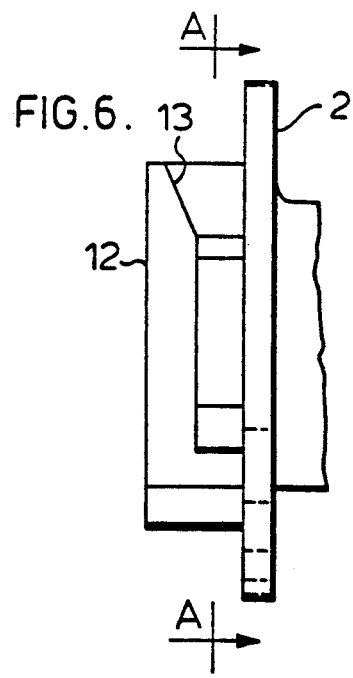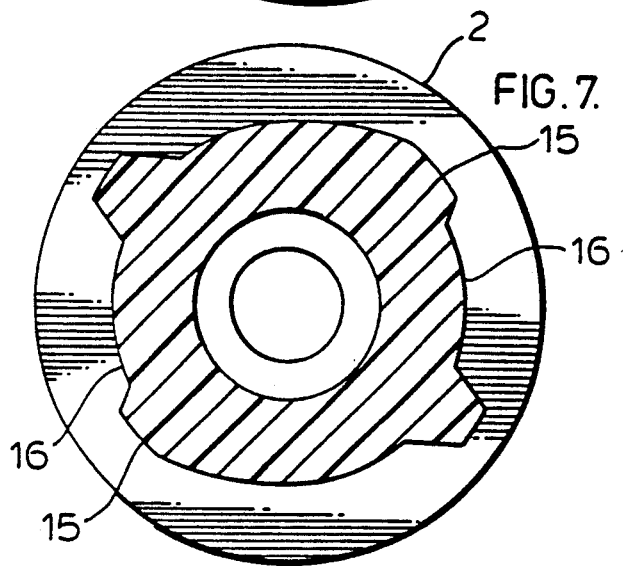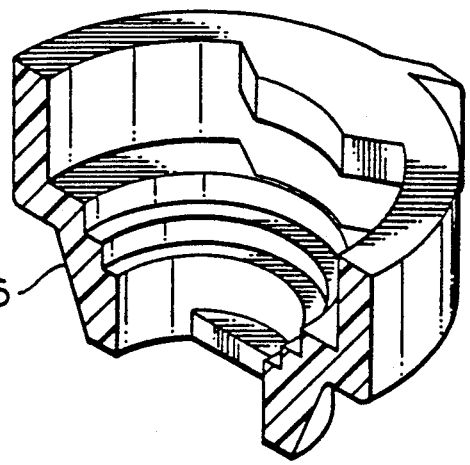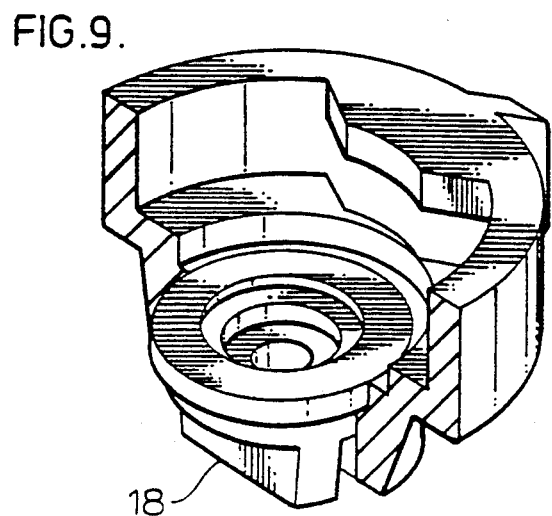

RADIALLY LOCKING SPRAY NOZZLE CAP

This is a continuation of application Ser. No. 828,298 filed on Jan. 30, 1993 which was abandoned upon the filing hereof.

This invention relates to nozzles, more particularly to spray nozzles of agricultural sprayers, and specifically to such spray nozzles adapted for quick and easy change of the spray tips to provide replacements for worn tips, different spray patterns, cleaning of clogged tips, or other desiderata.

In the prior art, the spray nozzles have comprised a nozzle body, connected by piping to a supply of liquid to be sprayed, a nozzle tip held in spraying position on the nozzle body by a twist-on nozzle cap, and a resilient washer also held in position by the cap to provide a liquid tight seal between the cap and body, provision generally being made also for any necessary seal, such as an "O" ring, between the cap and nozzle tip. The twist-on design of the caps has been the feature which permits the easy and rapid change of the caps used in the prior art, but the liquid tight seals between the caps and nozzle bodies have left much to be desired, and the handling of the tiny spray tips during change has been a problem which has become aggravated by the need to wear thick rubber gloves when working in contact with potentially harmful or dangerous chemical spray solution.

It is an object of this invention to provide an improved spray nozzle cap of particular utility on agricultural spray nozzles. The improved cap includes an improved cap locking mechanism that places less stress on the liquid seal between its spray tip and its nozzle body during installation. The improved cap is cheaper to produce and optionally can be produced with integral spray tips incorporated permanently into the caps, thus eliminating the separate handling of spray tips.

The invention thus consists in a radially locking spray nozzle cap adapted to hold a spray tip sealingly in liquid transfer communication with a nozzle body supplying liquid to be sprayed, said cap comprising a) generally cylindrical resilient side walls,
b) a bottom wall adapted to retain a spray tip in relatively fixed position sealingly against a nozzle body to which said cap is attached,
c) a pair of diametrically opposed lock lugs projecting radially inwardly at the top of said cylindrical side walls, adapted to fit over the bottom end of a nozzle body and, on rotation of the cap on said nozzle body, to engage a retainer flange on said nozzle body which flange holds said spray tip and cap sealingly in liquid communication with said nozzle body, said lock lugs, on further rotation of said cap, being adapted to ride over radial lock tabs on said nozzle body which radially distort said resilient side walls, then to remain in locked position in a pair of recesses in said nozzle body which retain said lock lugs without distorting said resilient side walls.

The invention furthermore consists in a nozzle body and spray tip retaining cap combination for a spray nozzle, comprising:

a) a nozzle body of generally cylindrical shape with a central bore adapted to conduct liquid to be sprayed from a spray tip at the outlet of the spray nozzle,
b) a circular planar flange surrounding the nozzle body near the discharge end thereof,
c) a retainer flange located substantially at the discharge end of the nozzle body, protruding radially from the nozzle body, axially spaced from said circular planar flange by a predetermined distance, and having a generally rectangular shape, with bevelled corners on the upper face of two diagonally opposite corners of the retainer flange,
d) a pair of radial lock tabs slightly protruding radially from the nozzle body, located on diametrically opposite sides thereof between said circular flange and said retainer flange and radially adjacent said bevelled corner,
e) a generally cylindrical radially locking cap adapted to fit over the discharge end of the nozzle body and hold a spray tip sealingly in liquid communication therewith, said cap having resilient cylindrical side walls and a bottom wall adapted to retain said spray tip and a resilient seal between said spray tip and the bottom of said nozzle body,
f) a pair of lock lugs, diametrically opposed and projecting radially inwardly at the top of said cylindrical side walls, said lock lugs having a thickness no greater than said predetermined distance and being adapted to fit on said nozzle body over the longer rectangular sides of the retainer flange and, when subsequently rotated on said nozzle body, force said lugs and cap to move axially along the nozzle as the lugs move across the bevelled corners of the retainer flange and to distort radially as the lugs move over said radial lock tabs,
g) a pair of recesses in the nozzle body adjacent said radial lock tabs, adapted to hold said lock lugs and cylindrical cap against counter rotation in undistorted condition.

The invention may be more readily understood from the ensuing description of preferred embodiments thereof made in reference to the accompanying drawings in which:

FIG. 5 is a bottom view of the nozzle body of FIGS. 1 and 3;

FIG. 6 is a side view of the bottom part of the nozzle body of FIG. 5;

FIG. 7 is a bottom view of a section of the nozzle body taken on the line A—A of FIG. 6.

FIG. 8 is a cross sectional isometric view of a cap similar to that of FIG. 4 but with the cap having a central opening in the stepped bottom wall 6 that is adapted to accommodate and hold a conventional spray tip.

FIG. 9 is a view of the cap of FIG. 8 additionally having a standard or conventional spray tip positioned interchangeably in the cap.

Figure 1:
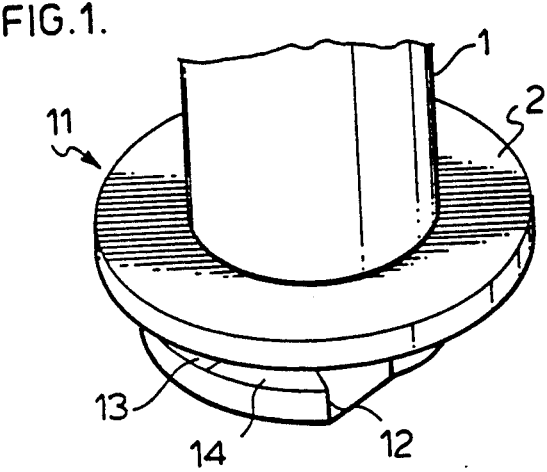
FIG. 1 is an isometric view showing the essential bottom parts of a nozzle body for use with a nozzle cap in accordance with the present invention.
Figure 2:
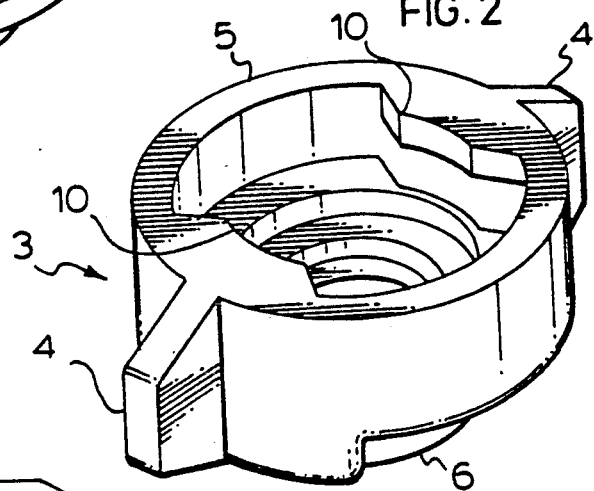
FIG. 2 is an isometric view of a nozzle cap of the present invention showing the essential parts for holding a spray tip onto the nozzle body of FIG. 1.
Figure 3:
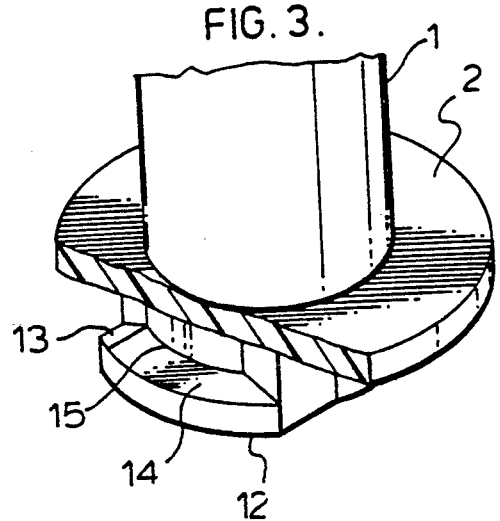
FIG. 3 is another view similar to FIG. 1 but with a part broken away to show greater detail of the nozzle body construction.

Referring to FIGS. 1 and 3, 1 represents the pipe or conduit of a nozzle body, 11, having a central bore which connects the body to a supply of liquid to be sprayed, as is conventional in the art. A flange, 2, protrudes radially from the body near the bottom thereof. Below the flange 2, the nozzle body is shaped to fit the radially locking twist-on cap of FIGS. 2 and 4 which holds and seals, by a liquid tight seal, the spray tip through which liquid is sprayed in a pattern determined by the shape of the opening on the spray tip. The nozzle body is conveniently and easily made of durable molded plastic material, the bore and shaped parts of the body lending themselves to formation in reasonably simple mold forms by conventional molding methods.

Figure 4:
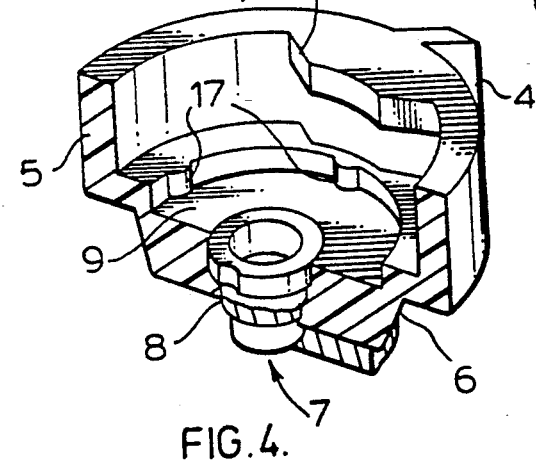
FIG. 4 is another view similar to FIG. 2 with part cut away to show greater detail and including a spray tip pressed or molded in the position in the cap in which it is held on the nozzle body in use.

Referring now to FIGS. 2 and 4, the radially locking cap, 3 of the invention is generally cylindrical, preferably with a pair of diametrically opposed wings, 4, on the sides to facilitate manual twist-on and twist-off installation and removal of the cap to and from the nozzle body. The cap 3 likewise is conveniently and easily made of durable molded plastic material, the shape of the cap also lending itself to formation in a simple mold form by conventional simple molding methods. However, while the nozzle body may be made fairly rigid, the cap must be made of a slightly resilient material that permits slight radial deformation of its generally circular shape during installation on, and removal from, the nozzle body as will be explained later herein.

The generally cylindrical side walls, 5, of the cap are practically enclosed at the bottom by a bottom wall, 6, which preferably and most conveniently has a stepped cross-section, as shown in FIG. 4, and has a central opening to hold a spray tip, 7. The spray tip 7 is held sealingly in the centre of the bottom wall, 6, optionally by an "O" ring seal, 8, and preferably by being pressed or molded permanently into the cap. In the preferred form of the invention the spray tip is molded permanently into the cap. In an alternative preferred form of the invention, the spray tip is an integrally molded orifice in the bottom wall, 6, of the cap, the size and shape of the orifice corresponds to the size and shape of the aperture of a conventional spray tip.

Spray tips are generally made of stainless steel, brass, plastic, or a stainless steel or ceramic material insert encapsulated in plastic to provide a conventionally shaped spray tip, and are manufactured with a variety of different sized and shaped central apertures or outlets which provide a variety of spray patterns and spray volumes at normal spray pressure. The size and type of outlet is usually stamped on the bottom or end of the spray tip which, being small, means that the indication must be even smaller and generally difficult to read. When the spray tips are pressed or molded into, and encased permanently in, the bottom wall of caps, the information can be stamped or embossed on the side wall of the caps with much larger characters than could be stamped on the spray tips themselves, thus facilitating identification of the tips before they are installed on nozzle bodies in their encapsulating caps.

Returning to FIG. 4, the stepped bottom wall 6 has a circular recessed washer seat, 9, surrounding the top of the spray tip 7 or the opening that accommodates the spray tip when it is not molded into the cap. When a cap is assembled on a nozzle body with a spray tip in position, a resilient rubber or synthetic polymer washer (not shown) is installed in the seat 9 to provide a liquid tight seal between the cap and nozzle body when the cap is tightened on the body, as will be explained later herein.

Projecting radially inwards at or near the top of the side wall 5 of the cap are two diametrically opposed lock lugs, 10. The top faces of the lugs 10 optionally and most conveniently are planar with the top of the side wall 5 and the bottom faces of lugs 10 also preferably planar and parallel to the top faces. Lugs 10 are adapted, when the cap is raised to the bottom of nozzle body 11, to pass over the two slightly curved longer sides of a generally rectangular shaped retainer flange whose ends also are similarly curved. This retainer flange, 12, (FIGS. 1, 3 and 5) surrounds part of the bottom of the conduit or pipe 1 of the nozzle body. The distance between the top of retainer flange 12 and the bottom of flange 2 is conveniently equal to or just slightly more than the thickness of lock lugs 10 in the axial direction. The top surface of two diagonally opposite corners of retainer flange 12 are bevelled to form two ramps, 13, (FIGS. 1, 3, and 5) which, when the cap is raised to fit lock lugs 10 past the longer sides of retainer flange 12 and rotated, engage the under sides of lock lugs 10 and force them and the cap 3 axially up the nozzle body 11 until the bottom of the nozzle body is pressed into sealing contact with a washer in the recessed washer seat 9 of the cap 3; when the bottom surfaces of lock lugs 10 are rotated pass the ramps 13, each comes to rest on a level area or land, 14, on the top surface of retainer flange 12. The cap thus compresses the washer to an optimum amount to establish and maintain a liquid seal, but does not compress it any further in achieving this final operating position.

To lock the cap in this final operating position without compressing the washer beyond the optimum amount to establish and maintain the desired liquid seal, there are provided two radial protruberences or radial lock tabs, 15, on the side of the nozzle body (FIGS. 3 and 7). In rotating the cap to force the lock lugs 10 up the ramps 13 onto the lands 14, the radially inward faces of lock lugs 10 must ride over the radial lock tabs 15 which slightly distort the slightly resilient sides of the cap radially until the lock lugs 10 come to their final operating position with their radially inward faces locked in position in a pair of recesses or lock lug lands, 16, (FIG. 7) on the nozzle body. In order to remove the cap from the body, the lock lugs 10 must be rotated from the lock lug land back over the shoulders of the radial lock tabs 15 until they can move axially, descending the ramps 15 to release compression on the washer. When the cap is in final operating position there should be little or no radial distortion of its sides, the lock lugs 10 being adapted to fit snugly into lock lug lands 16 without creating any significant radial distortion. The lower faces of the lock lugs 10 are adapted, when in final operating position on lands 14, to hold the washer in washer seat 9 under liquid sealing compression against the bottom of nozzle body 11. It should be noted however, that the washer is never compressed to a greater degree than this, even during installation of the cap. The lock lugs 10 hold the washer under liquid sealing compression while they remain on the lands 14, and twisting the caps on the body to the locked position with the lugs in the lock lug lands 16 does not place any greater compression on the washer.

Locking of the cap in the final operating position is achieved by the resilience of the side wall of the cap, which must be distorted radially to move the lock lugs 10 radially outwards to ride over the radial lock tabs 15 to remove the cap from the nozzle body.

As an aid to maintaining a resilient washer in place in washer seat 9 it may be convenient to have three or four small washer retainer protrusions, 17, on the side walls of seat 9, but these are entirely optional; they are easily made on the cap by machining recesses in the wall of the mold in which the cap is molded, to create the protrusions.

Various moldable resin materials may be used to make the nozzle body and spray cap combination of this invention, for example polypropylene, nylon, polycarbonate, and acetal resins. A preferred material for the nozzle body is Delrin (trademark) resin, While a preferred, more resilient, material for the cap is "Celcon" (trademark) resin, an acetal copolymer.

FIG. 8 shows a cap in accordance with the present invention in which the stepped bottom wall 6 has a central opening into which a conventional interchangeable spray tip can be fitted. FIG. 9 shows the cap of FIG. 8 with an interchangeable spray tip 18 fitted into place in the stepped bottom wall of the cap.

It will be obvious to those skilled in the art that to achieve a uniform and desired spray pattern for an agricultural sprayer, the spray tips, spray cap lock lugs, and nozzle body lock lands used in this invention should be appropriately oriented relative to the spray boom on which they are mounted. Numerous modifications may be made in the specific expedients described without departing from the present invention, the scope of which is defined in the following claims.

What is claimed is:

1. A radially locking spray nozzle cap, adapted to hold a spray tip sealingly in liquid transfer communication with a nozzle body supplying liquid to be sprayed and requiring application during installation of said nozzle cap to lock it on said nozzle body of no axial pressure greater than liquid compression, said cap comprising:
    a) generally cylindrical side walls, adapted to permit slight radial deformation of their generally circular shape,
    b) a bottom wall adapted to retain a spray tip in relatively fixed position sealingly against a nozzle body to which said cap is attached,
    c) a pair of diametrically opposed lock lugs projecting radially inwardly at the top of said cylindrical side walls, adapted to fit over the bottom end of a nozzle body and, on rotation of the cap on said nozzle body, to engage a retainer flange on said nozzle body which flange holds said spray tip and cap sealingly in liquid communication with said nozzle body, said lock lugs being adapted to permit radial displacement and, on further rotation of said cap, being adapted to ride over radial lock tabs on said nozzle body which radially distort said resilient side walls, then to remain in locked position in a pair of recesses on said nozzle body which retain said lock lugs without significantly distorting said resilient side walls.

2. A radially locking spray nozzle cap as claimed in claim 1 in which said cap is molded resilient plastic with an integrally molded orifice in its bottom wall.

3. A radially locking spray nozzle cap as claimed in claim 1 in which said cap is resilient molded plastic having a central opening in the bottom wall adapted to hold a replaceable conventional spray tip sealingly in said cap.

4. A radially locking spray nozzle cap as claimed in either claim 2 or 3, having a recessed washer seat in the bottom wall adapted to retain a resilient washer in said seat sealingly between said cap and a nozzle body.

5. A radially locking spray nozzle cap as claimed in claim 1 in which said cap is molded resilient plastic with a spray tip insert of stainless steel, ceramic, brass, or plastic pressed or molded permanently in said bottom wall.

6. A radially locking spray nozzle cap as claimed in claim 5, having a recessed washer seat in the bottom wall adapted to retain a resilient washer in said seat sealingly between said cap and a nozzle body.

7. A nozzle body and spray tip retaining cap combination for a spray nozzle, comprising:
    a) a nozzle body of generally cylindrical shape with a central bore adapted to conduct liquid to be sprayed from a spray tip at the outlet of the spray nozzle,
    b) a circular planar flange surrounding the nozzle body near the discharge end thereof,
    c) a planar retainer flanged located substantially at the discharge end of the nozzle body, protruding radially from the nozzle body, axially spaced from the circular flange by a predetermined distance, and having a generally rectangular shape, with bevelled corners on the upper face of two diagonally opposite corners of the retainer flange,
    d) a pair of radial lock tabs slightly protruding radially from the nozzle body, located on diametrically opposite sides thereof between said circular flange and said retainer flange and radially adjacent said bevelled corners,
    e) a generally cylindrical radially locking cap adapted to fit over the discharge end of the nozzle body and hold a spray tip sealingly in liquid communication therewith, said cap having resilient cylindrical side walls and a bottom wall adapted to retain said spray tip and a resilient seal between said cap and the bottom of said nozzle body,
    f) a pair of lock lugs, diametrically opposed and projecting radially inwardly at the top of said cylindrical side walls, said lock lugs having a thickness no greater than said predetermined distance and being adapted to fit on said nozzle body over the longer rectangular sides of the retainer flange and, when subsequently rotated on said nozzle body, force said lugs and cap to move axially along the nozzle as the lugs move across the bevelled corners of the retainer flange and to distort radially as the lugs move over said radial lock tabs,
    g) a pair of recesses in the nozzle body adjacent said radial lock tabs, adapted to hold said lock lugs and cap against counter rotation in undistorted condition of this cap.

8. The nozzle body and spray cap combination as claimed in claim 7 wherein said cap is molded resilient plastic with an integrally molded orifice in its bottom wall.

9. The nozzle body and spray cap combination as claimed in claim 7 wherein said cap is molded resilient plastic having a central opening in the bottom wall adapted to hold a replaceable conventional spray tip sealingly in said cap.

10. The nozzle body and spray cap combination as claimed in claim 9 together with a spray tip insert of stainless steel, ceramic, brass, or plastic fitted into said opening.

11. The nozzle body and spray cap combination as claimed in claim 7 wherein said cap is molded resilient plastic with a spray tip of stainless steel, ceramic, brass, or plastic pressed or molded permanently in said bottom wall.

* * * * *